United States Patent
Matsu

(10) Patent No.: US 7,131,569 B2
(45) Date of Patent: Nov. 7, 2006

(54) TITANIUM-MADE PLATE-TYPE HEAT EXCHANGER AND PRODUCTION METHOD THEREFOR

(75) Inventor: Koutarou Matsu, Mitaka (JP)

(73) Assignee: Tokyo Bureizu Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/508,769

(22) PCT Filed: Sep. 3, 2002

(86) PCT No.: PCT/JP02/08951

§ 371 (c)(1),
(2), (4) Date: Sep. 22, 2004

(87) PCT Pub. No.: WO03/089866

PCT Pub. Date: Oct. 30, 2003

(65) Prior Publication Data

US 2005/0161494 A1 Jul. 28, 2005

(30) Foreign Application Priority Data

Apr. 22, 2002 (JP) .............................. 2002-119457

(51) Int. Cl.
*B23K 31/02* (2006.01)
(52) U.S. Cl. ............. 228/183; 29/890.059; 228/262.72
(58) Field of Classification Search ................ 228/183; 29/890.054
See application file for complete search history.

(56) References Cited

U.S. PATENT DOCUMENTS

| | | | | |
|---|---|---|---|---|
| 4,602,731 A | * | 7/1986 | Dockus | 228/121 |
| 5,013,612 A | * | 5/1991 | Hunt et al. | 428/552 |
| 6,149,051 A | * | 11/2000 | Vollmer et al. | 228/262.72 |

FOREIGN PATENT DOCUMENTS

| | | |
|---|---|---|
| JP | 1994-155071 | 6/1994 |
| JP | 2001-175169 | 6/2001 |
| JP | 2002-5589 | 1/2002 |
| JP | 2002-35929 | 2/2002 |

* cited by examiner

*Primary Examiner*—Jonathan Johnson
(74) *Attorney, Agent, or Firm*—James Creighton Wray

(57) ABSTRACT

The present invention provides a titanium-made plate-type heat exchanger comprising first-fluid flow paths and second-fluid flow paths arranged alternately, which is formed by joining titanium-made constituting members, wherein: a titanium-zirconium based brazing solder containing 20 to 40 wt. % of titanium and 20 to 40 wt. % of zirconium, which melts under 880° C., is coated over positions to be connected of the constituting members, and brazing solder coated constituting members are heated under 880° C. in an vacuum and/or inert gas atmosphere. The present invention also provides a production method of the heat exchanger, which can prevent titanium-made constituting members of the heat exchanger from being deteriorated due to over-heating.

1 Claim, 5 Drawing Sheets

TITANIUM-MADE PLATE-TYPE HEAT EXCHANGER AND PRODUCTION METHOD THEREFOR

This application claims the benefit of Japanese Application No. 2002-119457 filed Apr. 22, 2002 and PCT/JP02/08951 filed Sep. 3, 2002.

BACKGROUND OF THE INVENTION

1. Field of the Invention

The present invention relates to a production method of a titanium-made plate-type heat exchanger.

2. Related Art

A conventional titanium-made plate-type heat exchanger is disclosed in Japanese laid open patent No.2002-35929. In the heat exchanger by this invention, herringbone patterned titanium plates are layered such that herringbone patterns of the neighboring plates are arranged in opposite directions each other, and first-fluid flow paths and second-fluid flow paths formed by gaps between the two neighboring plates are alternately arranged so that heat is exchanged between the two fluids.

The above-mentioned heat exchanger is produced according to the following steps: positions to be connected on respective herringbone plates are coated with or filled by a brazing solder; the coated or filled plates are placed in a vacuum heating furnace and the plates are degassed as reducing the pressure of the furnace and gradually raising the temperature of the furnace; and after a required reduced pressure is attained, coated or filled positions are brazed by heating the plates over 850° C.

However, the conventional titanium-made plate-type heat exchanger has the following problems.

(1) Since herringbone patterns are formed by concave strips with a chevroned cross section, two neighboring plates are contacted on concave edge points of respective concave strips crossing each other. Consequently, connected positions by the brazing solder show a point to point connection pattern so that a connected strength between the neighboring plates is low. As a result, a pressure-resistant performance of the flow paths of the heat exchanger is not so good.

(2) Since a heat transfer area of fluid flow paths formed by the two herringbone plates corresponds to surface areas of the herringbone plates, a heat transfer area per unit volume of the heat exchanger is not so large. Consequently, a heat radiating performance of the flow paths is not so good.

(3) When the plates are brazed at a temperature more than the transformation temperature (882° C.) of α-titanium, the herringbone plates are deteriorated, which means a durability of the heat exchanger is deteriorated.

And in producing the conventional titanium-made plate-type heat exchanger, since the herringbone plates are brazed over 850° C., they are deteriorated. Because when the brazing solder is heated over 850° C., sometimes the titanium-made plates are heated over the transformation temperature (882° C.) of α-titanium so that these plates are deteriorated.

The present invention is carried out in order to solve the problems mentioned above, and provides:

(1) A production method of a titanium-made plate-type heat exchanger having fluid flow paths with a pressure resistant performance, an excellent heat radiating performance and an excellent durability;

(2) A method to produce a titanium-made plate-type heat exchanger capable of preventing titanium members constituting the fluid flow path from deteriorating due to over-heating.

DETAILED DESCRIPTION OF THE PREFERRED EMBODIMENTS

A titanium-made plate-type heat exchanger provided by the present invention in which flow paths of a first fluid and a second fluid are alternately arranged such that heat can be exchanged between the two fluids and respective flow paths are formed by connecting titanium plates; the heat exchanger comprises a flat container having an inlet of one of the fluids formed on one end and an outlet of the fluid formed on the other end; an offset-type titanium plate fin connected to the titanium plates on its both sides and accommodated in the flat container between the inlet and the outlet, wherein: the titanium plate fin and the titanium plates are connected by a Ti—Zr type brazing solder, which melts under 880° C., containing 20 to 40 wt. % of titanium and 20 to 40 wt. % of zirconium.

And a production method of a titanium-made plate-type heat exchanger provided by the present invention in which flow paths of a first fluid and flow paths of a second fluid alternately arranged such that heat can be exchanged between the two fluids, wherein the production method for forming the flow paths by connecting a titanium-made flat container having an inlet of one of the fluids formed on one end and an outlet of the fluid formed on the other end to an offset-type titanium plate fin accommodated in the flat container and connected to the inner side of the container via top ends of concave strips of the titanium plate fin so as to form a plane to plane connection, comprises steps of: coating a brazing paste over positions to be connected of said constituting members by using a paste supply machine, wherein the brazing paste is prepared by atomizing an alloy comprising a Ti—Zr type brazing solder, which melts under 880° C., containing 20 to 40 wt. % of titanium and 20 to 40 wt. % of zirconium so as to obtain a powdered alloy, which is mixed with a neutral binder so that the brazing paste is prepared; and heating said brazing solder coated constituting members under 880° C. in an vacuum and/or inert gas atmosphere (hereinafter referred as "production method of heat exchanger").

In the heat exchanger by the present invention, since top ends of parallel concave strips constituting a pattern of the titanium plate fin constitute a plane which contacts the titanium plate in a plane to plane relation, the titanium plate fin and the titanium are connected by the brazing solder in the form of the plane to plane connection. Consequently, a connected area between the titanium plate and the titanium plate fin is enlarged so that a connected strength is raised.

In the titanium plate fin, the concave strips constituting the pattern of the titanium plate fin show an offset arrangement. Namely, both walls of the concave strip T having a trapezoidal cross section are bent inside with a predetermined pitch. Consequently, a surface area of the titanium plate fin is enlarged so that a heat transfer area of the heat exchanger per unit area is raised.

Further, since a connection between the titanium plates and a connection between the titanium plate and the titanium plate fin are attained by using the brazing solder which melts under 880° C., namely under the transformation temperature (882° C.) of α-titanium, the above-mentioned titanium plates to be connected are not heated over 880° C. As a result, both titanium plates are not deteriorated due to over-heating.

And in the production method of the heat exchanger by the present invention, since the connection between the titanium plates and the connection between the titanium plate and the titanium plate fin are attained by using the brazing solder which melts under 880° C., the above-mentioned titanium plates to be connected are not heated at the transformation temperature of α-titanium, when brazed. As a result, the production method by the present invention can prevent both titanium plates from being deteriorated due to over-heating.

Particularly, the production method by the present invention employs the paste-type brazing solder, since alloys used for the brazing solder by the present invention have high hardness and very low malleability, they can not be obtained in the form of a plate or a bar. Therefore the alloys are atomized in Ar gas atmosphere to obtain powdered alloys, which are mixed with the neutral binder to obtain the paste, which is supplied as the brazing solder to portions to be connected by utilizing the paste supply machine.

BEST PREFERRED EMBODIMENTS BY THE PRESENT INVENTION

Figure 1:
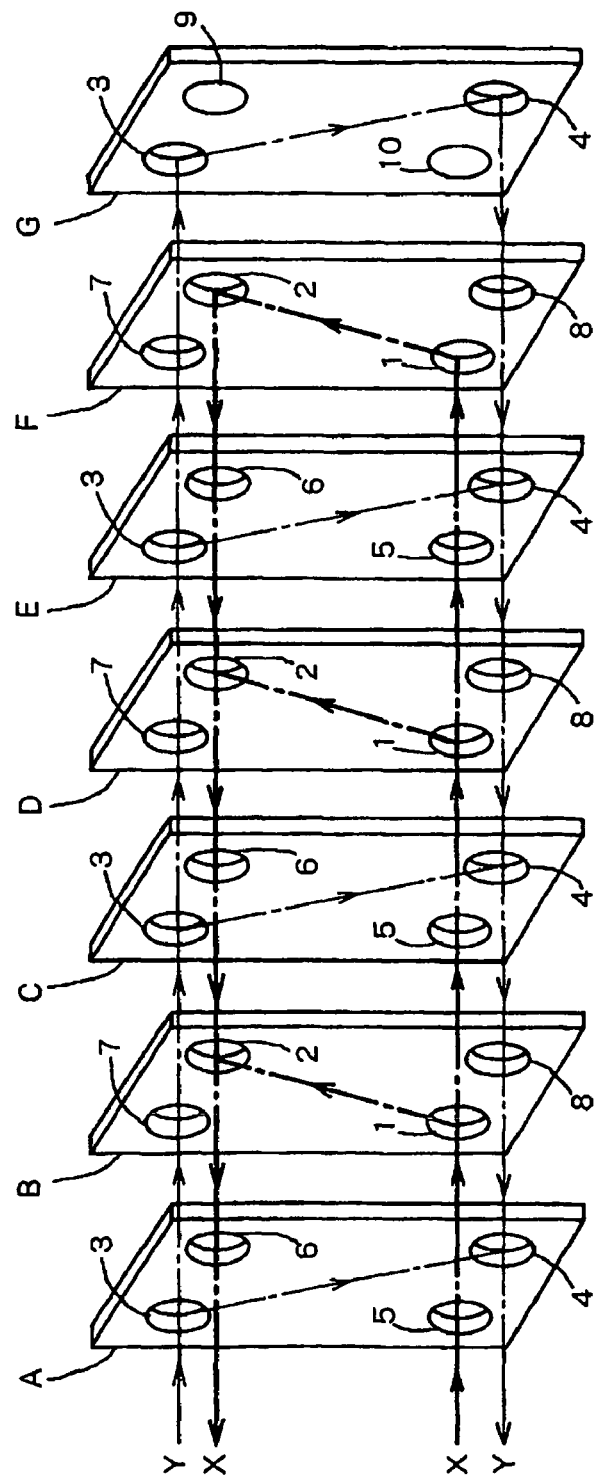
FIG. 1 is a perspective view schematically illustrating an arrangement of the titanium-made plate-type heat exchanger obtained by a preferred production method by the present invention.

Hereinafter the embodiment by the present invention is explained as referring to drawings FIG. 1 is a view schematically illustrating the arrangement of the titanium-made plate-type heat exchangers (hereinafter referred as "heat exchanger") obtained by the production method of the preferred embodiment.

As shown in FIG. 1, flow paths B, D and F for a first fluid X and flow paths A, C, E and G for a second fluid Y are alternately arranged so that heat is exchanged between the two fluids X and Y.

The first fluid X flows into the flow paths B, D and F from respective inlets 1 and flows out from respective outlets 2. The second fluid Y flows into the flow paths A, C, E and G from respective inlets 3 and flows out from respective outlets 4.

A reference numeral "5" is passages for the fluid X arranged in the flow paths A, C and E and communicated with the inlets 1. A reference numeral "6" is passages for the fluid X arranged in the flow paths A, C and E and communicated with outlets 2.

A reference numeral "7" is passages for the fluid Y arranged in the flow paths B, D and F and communicated with the inlets 3. A reference numeral "8" is passages for the fluid Y arranged in the flow paths B, D and F. Reference numerals "9" and "10" are shut-off paths arranged in the flow path G.

Figure 2:
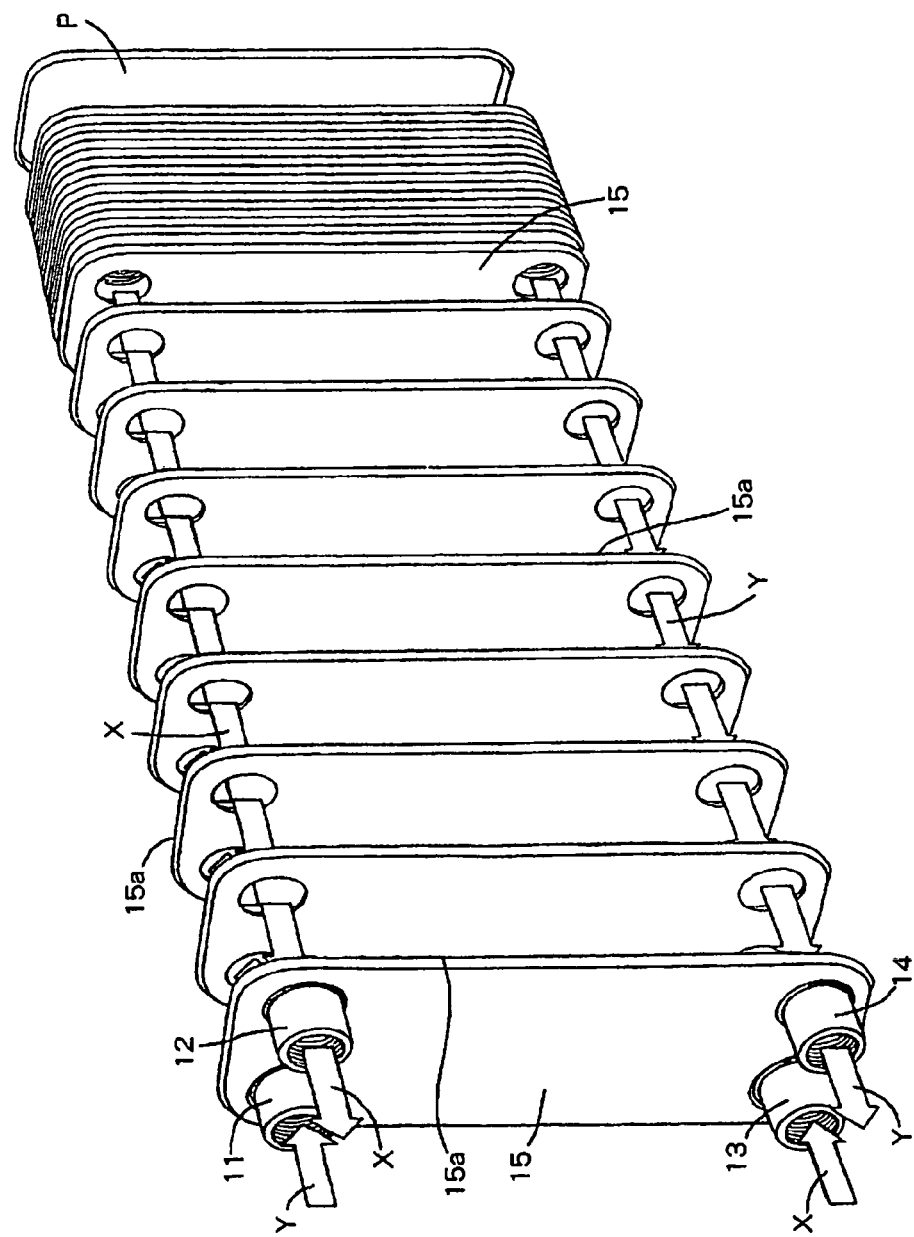
FIG. 2 is an exploded perspective view of the titanium-made plate-type heat exchanger shown in FIG. 1.
Figure 3:
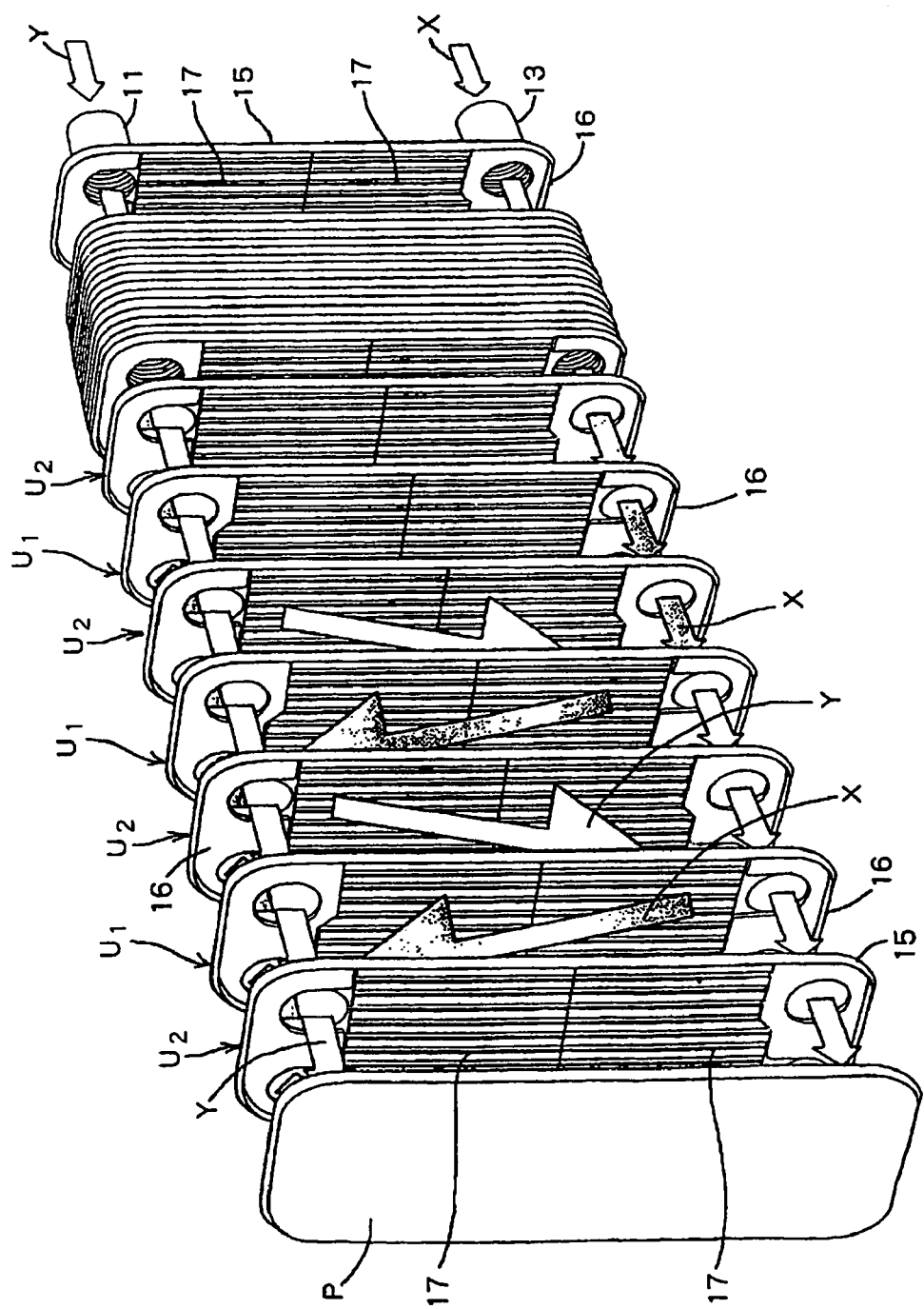
FIG. 3 is a perspective view of the titanium-made plate-type heat exchanger in FIG. 2 viewed from the opposite direction.

FIGS. 2 and 3 are exploded views of the above-mentioned heat exchanger.

As shown in FIGS. 2 and 3, the heat exchanger is constituted in the following manner. First unit plates (hereinafter referred as "first unit") $U_1$ and second unit plates (hereinafter referred as "second unit") $U_2$ are alternately layered and connected each other. Bosses 11, 12, 13 and 14 are attached to the front end second unit $U_2$ and a cover plate P is attached to the back end second unit $U_2$.

Figure 4A:
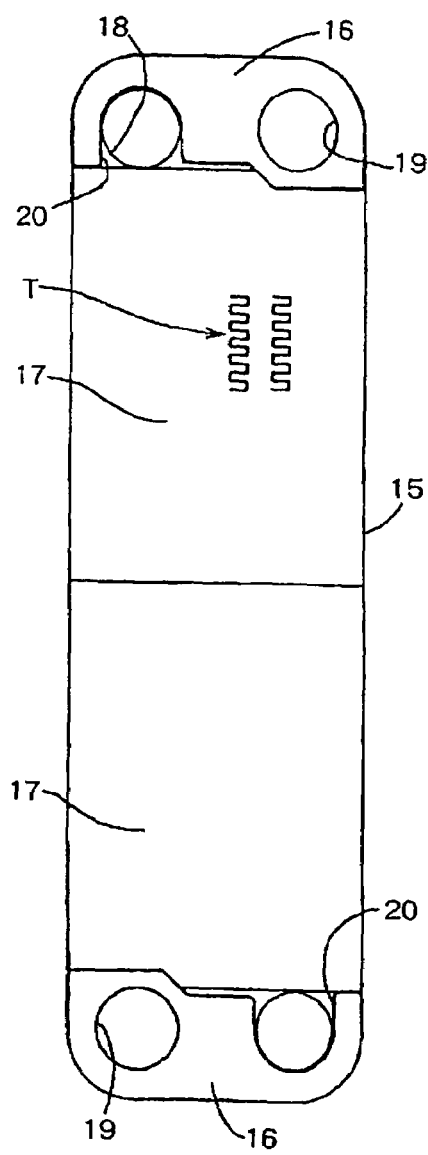
FIG. 4A is a plan view of first unit plate and FIG. 4B is a plan view of the second unit plate in FIG. 3.
Figure 4B:
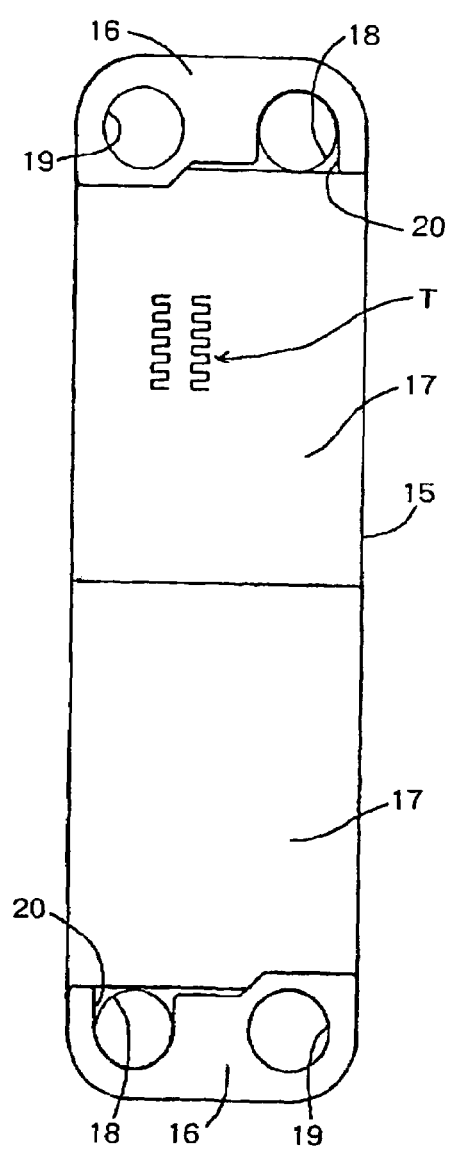

As shown in FIGS. 4A and 4B, the first and second units $U_1$ and $U_2$ are respectively constituted by titanium plates 15 having upright peripheral walls 15a around, titanium guide plates 16, 16 arranged at both longitudinal ends of the titanium plates and two titanium plate fins 17 arranged between the titanium guide plates 16, 16.

Two holes 18 are arranged at each end of the titanium plate 15 so that four holes 18 are symmetrically arranged on both ends of the titanium plate.

A circular hole 19 and a U-shaped cut-out hole 20 are arranged in the titanium guide plate 16. The titanium guide plate 16 is a plate for guiding the fluids and has the same thickness as the titanium plate fin 17. The holes 19 and 20 in the titanium guide plate 16 on the titanium plate 15 of the first unit $U_1$ and second unit $U_2$ are arranged in opposite directions.

The circular hole 19 and the U-shaped cut-out hole 20 are respectively communicated with the holes 18.

Mutually communicated holes 18 and 19 constitute the passage (passages 5–8 in FIG. 1) communicating two neighboring flow paths, when the first and second units $U_1$ and $U_2$ are layered.

And the hole 18 and the cut-out hole 20 mutually communicated each other constitute the inlet (inlets 1 and 3 in FIG. 1) to the flow path of the fluid or the outlet (outlets 2 and 4 in FIG. 1) from the flow path, when the first and second units $U_1$ and $U_2$ are layered.

Figure 5:
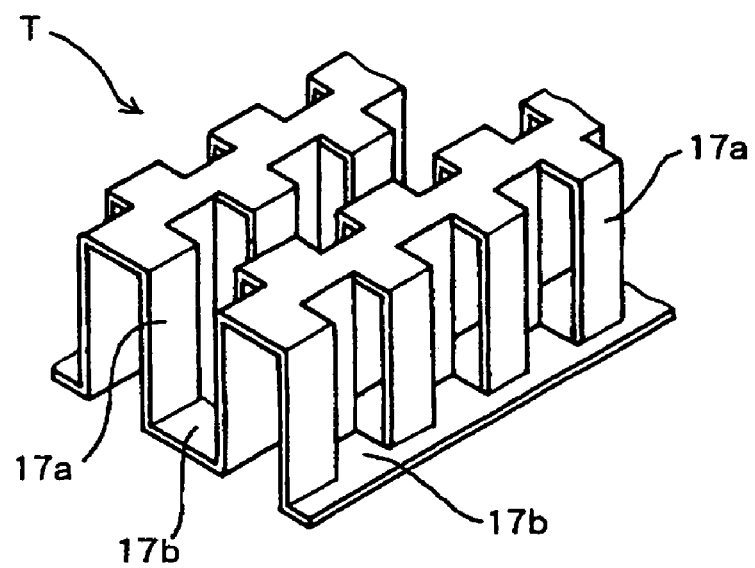
FIG. 5 is a perspective view illustrating main portions of titanium plate fins in FIG. 4.

FIG. 5 shows a detailed arrangement of a concave strip T which forms parallel wave-shaped pattern of the titanium plate fin 17 shown in FIG. 4. The concave strip T shows an offset arrangement. Namely, pairs of slits are formed with a predetermined pitch from top portions of the both walls 17a of the concave strip T having a trapezoidal cross section to a base plate 17b and portions formed by pairs of the slits are bent inside. The top end of the concave strip T forms a plane.

The flow paths A, C and E in FIG. 1 are formed between the second unit $U_2$ and the titanium plate 15 of the first unit $U_1$ placed on the second unit and connected each other by the brazing solder, which can be understood when FIG. 1 is compared with FIGS. 2 and 3.

The flow paths B, D and F are formed between the first units $U_1$ and the titanium plates 15 of the second units $U_2$ placed on the first units and connected each other by the brazing solder. The flow path G is formed between the second unit $U_2$ and the cover plate P covered over the second unit and brazed.

The neighboring titanium plates 15 are connected via the peripheral walls 15a of the respective titanium plates. The titanium plate fin 17 is connected with the titanium plate 15 via top end of the concave strip T. The both sides of the titanium guide plate 16 are connected to the titanium plates 15. The above-mentioned respective connected portions are connected in the form of plane to plane connection.

The holes 18 of the titanium plate 15 and the holes 19 of the titanium guide plate 16, which form passages (the passages 5 to 8 in FIG. 1) for the fluids, are connected via peripheral portions of the respective holes.

The heat exchanger by the embodiment is produced in the following manner.

(1) A brazing solder is coated on the portions to be connected of the first units $U_1$, second units $U_2$, the cover plate P and the bosses 11 to 14, and then coated members with the brazing solder are assembled so that a heat exchanger assembly is prepared.

For example, one of the brazing solders shown in TAB.1, which melt under 880° C., is used as a brazing solder.

Both brazing solders contain mainly titanium and zirconium. In other words, Ti—Zr alloys are employed as the brazing solders. TAB.1 indicates that a brazing solder containing no Ni metal such as No.1 product can be used as a brazing solder and rather small amount of Cu metal is required as a constituent of the brazing solders.

TABLE 1

| Product | Composition (wt. %) | | | | Melting |
|---|---|---|---|---|---|
| # | Ti | Zr | Cu | Ni | Point (° C.) |
| No.1 | 37.5 | 37.5 | 25 | 0 | 820–840 |
| No.2 | 37.5 | 37.5 | 15 | 10 | 810–830 |

Since the products in TAB.1 have high hardness and very low malleability, they can not be obtained in the form of a plate or a bar. Consequently, in order to employ the products as a brazing solder, they are atomized in argon gas atmosphere to obtain powdered products, which are mixed with a neutral binder to obtain a paste, which is supplied as the brazing solder to portions to be connected by utilizing a paste supply machine.

Then the prepared heat exchanger assembly is placed in a vacuum heating furnace and heated gradually after the pressure in the furnace is reduced to around $10^{-4}$ torr.

The pressure in the furnace is not necessarily reduced to a lower level, but it can be acceptable more than $10^{-4}$ torr. In stead of the reduced pressure, an inert gas atmosphere by Ar or He gas can be employed, or the inert gas atmosphere under the reduced pressure can be also employed.

(3) When a temperature in the furnace is raised up to 830° C. to 880° C., the furnace is kept at the raised temperature for ca. 30 min. And the temperature in the furnace is lowered afterward.

POSSIBILITIES FOR INDUSTRIAL USE

As explained above, the pressure resistant performance of flow paths is improved in the heat exchanger by the present invention, since the titanium plate and titanium plate fin are connected by the brazing solder in the form of plane to plane connection.

Since the titanium plate fin has the offset arrangement, the surface area of the titanium fin plate is enlarged, namely, a heat transfer area between the fluids is enlarged so that the heat radiation performance of the heat exchanger is enhanced.

Further, since the brazing solder with a melting point lower than 880° C. is employed to connect titanium members which are not heated at a high temperature, the connected titanium members of the heat exchanger are not deteriorated so that durability of the heat exchanger is improved.

And according to the production method of the heat exchanger by the present invention, since the brazing solder having a melting point lower than 880° C. to connect titanium members is employed, the production method can prevent the titanium members from deterioration caused by over-heating.

The invention claimed is:

1. A production method of a titanium-made plate-type heat exchanger comprising flow paths of a first fluid and flow paths of a second fluid alternately arranged such that heat can be exchanged between the two fluids, said production method for forming said flow paths by connecting a titanium-made flat container having an inlet of one of the fluids formed on one end and an outlet of the fluid formed on the other end to an offset-type titanium plate fin accommodated in said flat container and connected to the inner side of said container via top ends of concave strips of said titanium plate fin so as to form a plane to plane connection, comprising steps of:

coating a brazing paste over positions to be connected of said constituting members by using a paste supply machine, wherein said brazing paste is prepared by atomizing an alloy comprising a Ti—Zr type brazing solder, which melts under 880° C., containing 20 to 40 wt. % of titanium 20 to 40 wt. % of zirconium, 15 to 25 wt % of copper and 0 to 10 wt % of nickel so as to obtain a powdered alloy, which is mixed with a neutral binder so that said paste is prepared; and heating said brazing solder coated constituting members under 880° C. in an vacuum and/or inert gas atmosphere.

\* \* \* \* \*